United States Patent [19]
McCurdy, Jr.

[11] Patent Number: 5,988,766
[45] Date of Patent: Nov. 23, 1999

[54] ELECTROPNEUMATICAL BRAKE ADAPTOR

[75] Inventor: William B. McCurdy, Jr., Watertown, N.Y.

[73] Assignee: New York Air Brake Corporation, Watertown, N.Y.

[21] Appl. No.: 08/888,199

[22] Filed: Jul. 3, 1997

[51] Int. Cl.⁶ .................................................. B60T 11/34
[52] U.S. Cl. ................................. 303/28; 303/3; 303/15; 303/86
[58] Field of Search .............................. 303/3, 7, 15, 28, 303/33, 80

[56] References Cited

U.S. PATENT DOCUMENTS

| | | | |
|---|---|---|---|
| 2,993,199 | 7/1961 | Browne et al. | 303/3 |
| 5,335,974 | 8/1994 | Klink | 303/3 |
| 5,390,988 | 2/1995 | Shank | 303/3 |
| 5,451,099 | 9/1995 | Hart et al. | 303/3 |
| 5,509,727 | 4/1996 | Hart et al. | 303/3 |
| 5,559,281 | 9/1996 | McKay et al. | 303/3 |
| 5,709,436 | 1/1998 | Scott | 303/1 |

*Primary Examiner*—Matthew C. Graham
*Attorney, Agent, or Firm*—Barnes & Thornburg

[57] ABSTRACT

An adaptor for connecting brake pipe, brake cylinder, emergency and auxiliary reservoir ports on a standard pipe bracket to an electropneumatic control valve. The adaptor also includes threaded post to mount the electropneumatic valve to the adaptor and fastener apertures to receive fasteners to mount the adaptor to the pipe bracket.

12 Claims, 5 Drawing Sheets

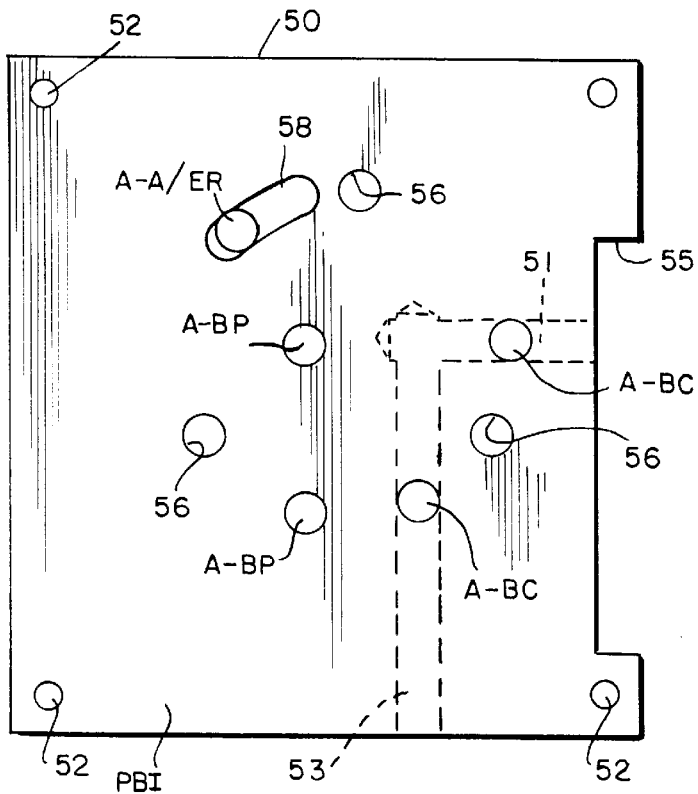
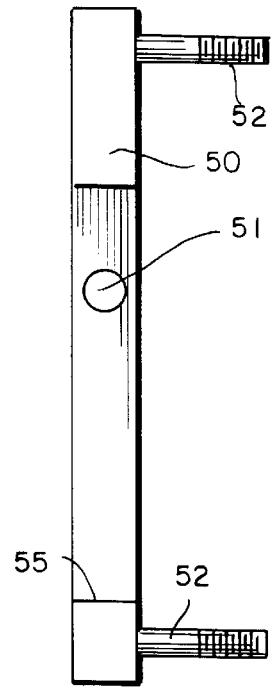
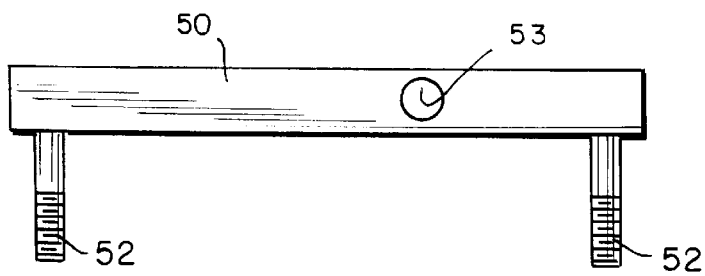

ELECTROPNEUMATICAL BRAKE ADAPTOR

BACKGROUND AND SUMMARY OF THE INVENTION

The present invention relates generally to electropneumatic ("EP") brake control valves and more specifically, to an adaptor for connecting a retrofit unit to convert a pneumatic brake control valve to electropneumatic brake control valve.

Electropneumatic brake control valves are well known in the passenger railroad art and the mass transit railroad art. Because the trains are short and are not involved generally in a mix and match at an interchange of different equipment, the ability to provide pneumatic and electrical control throughout the train has been readily available in the passenger and the mass transit systems. In freight trains, the trains may involve as much as 100 cars stretching over one mile or more. The individual cars may lay idle in harsh environments for up to a year without use. Also, because of the long distance they travel, the cars are continuously moved from one consist to another as it travels to its destination. Thus, the use of electropneumatic-pneumatic valves in the freight trains has been very limited.

The major use of electropneumatic valves in freight trains have been at the locomotive. This is where electric power is available and the electrical interconnection is easy to achieve. Also, by the use of radio waves, the simultaneous braking at various positions along the train using slave locomotives with electropneumatic valves has also been used on freight trains. Recently, the American Association of Railroads ("AAR") has undertaken a massive study to determine an appropriate regime of incorporating electropneumatic valves on each of the cars of a freight train.

Various overlay systems have been proposed for use with control valves for freight trains. One is shown by U.S. Pat. No. 5,390,988 to Shank. This is an overlay system wherein an adaptor is inserted to the service portion of a standard pneumatic brake control valve and electrically operates pneumatic valves to pneumatically control a standard brake control valve. The overlay is inserted between the service portion and its accelerated release valve portion. It is a pilot adaptor wherein the electropneumatic portion provides pneumatic signals to the control valve to operate in its normal matter. The only direct connection of the electropneumatic portion and the brake cylinder is for graduated release wherein the brake cylinder can be connected to exhaust through the electropneumatic valve.

Another overlay system is illustrated in U.S. Pat. No. 5,335,974 to Klink. This system also includes an electronic module and electropneumatic valves connected to a standard freight control valve. A pneumatic interface with transducers is provided between the service portion and the pipe bracket of a standard pneumatic brake control valve.

Another recent overlay system for a freight brake control valve is shown in U.S. Pat. No. 5,393,129 to Troiani et al. The two previously discussed patents to Shank and Klink provided adaptors or overlay to the service portion of the control valve or at the interface between the service portion and the pipe bracket so as not to change the connection of the train fluid system to the pipe bracket. Troiani et al. provides their overlay at the connection of the pneumatic system to the pipe bracket. The electropneumatic valve system is connected to the emergency reservoir and between the retainer port of the pipe bracket and the retainer.

A train inspection apparatus is disclosed in U.S. Pat. No. 2,993,199 to Browne et al. A pneumatic interface is provided between the emergency portion and the pipe bracket. This interface not only monitors the condition of the brake valve but also allows electropneumatic operation or an overlay of the pneumatic operation of the pneumatic brake valve. As with Shank and Klink, Brown et al. does not require modification of the connection of the fluid systems to the pipe bracket.

It is an object of the present invention to provide an adaptor for an electropneumatic retrofit unit which can be mated with the service/emergency portion interface of a pipe bracket.

These and other objects are achieved by an adaptor for connecting an electropneumatic control valve to a brake control valve having at least a pipe bracket with interface ports at a first and second face for mating with a service portion and an emergency brake portion when interconnected to the pipe bracket at a respective face.

The adaptor has a first interface for interfacing with a first face of the pipe bracket and a second interface for interfacing with a first face of the electropneumatic valve. The adaptor also includes a brake pipe passage connecting the brake pipe ports at its first and second interfaces, which mate with brake pipe interface ports of the pipe bracket and brake pipe ports of the electropneumatic valve. A brake cylinder passage in the adaptor connects brake cylinder ports at the first and second interfaces, which mate with the brake cylinder interface of the pipe bracket and the brake cylinder port of the electropneumatic valve. A reservoir passage in the adaptor connects reservoir ports at first and second interfaces which mate with emergency and auxiliary reservoir interface ports of the pipe bracket and a reservoir port of the electropneumatic valve.

Fasteners extend from the second interface of the adaptor and align with apertures of the electropneumatic valve. Fastener apertures extend between the first and second interfaces of the adaptor and align with apertures of the pipe bracket for receiving a fastener. Thus, the adaptor is mounted to the pipe bracket and the electropneumatic valve is mounted to the adaptor.

The first and second faces of the pipe bracket are either on opposite sides or on the same side of the pipe bracket, depending on the style of the pipe bracket. When the pipe bracket includes two brake pipe interface ports and the electropneumatic valve includes two brake pipe ports, the adaptor includes two brake pipe passages each connecting brake pipe ports at its first and second interfaces. When the pipe bracket includes two brake cylinder interface ports, the adaptor includes two brake cylinder ports on its first interface and the brake cylinder passage connects the two cylinder ports on its first interface to a single brake cylinder port on the second interface. Where necessary, a recess in the edge of the adaptor extends between the interfaces for receiving a portion of the electropneumatic valve which extends beyond the first face of the electropneumatic valve. In one embodiment, the adaptor was designed for the service brake portion interface and the extended portion of the electropneumatic valve is a manual relief valve.

BRIEF DESCRIPTION OF THE DRAWINGS

FIG. 8 is a bottom view of the adaptor of FIG. 7.

FIG. 9 is a side view of the adaptor of FIG. 9.

FIG. 10 is a view of the pipe bracket interface of the adaptor of FIG. 7.

DETAILED DESCRIPTION OF THE PREFERRED EMBODIMENTS

Figure 1:
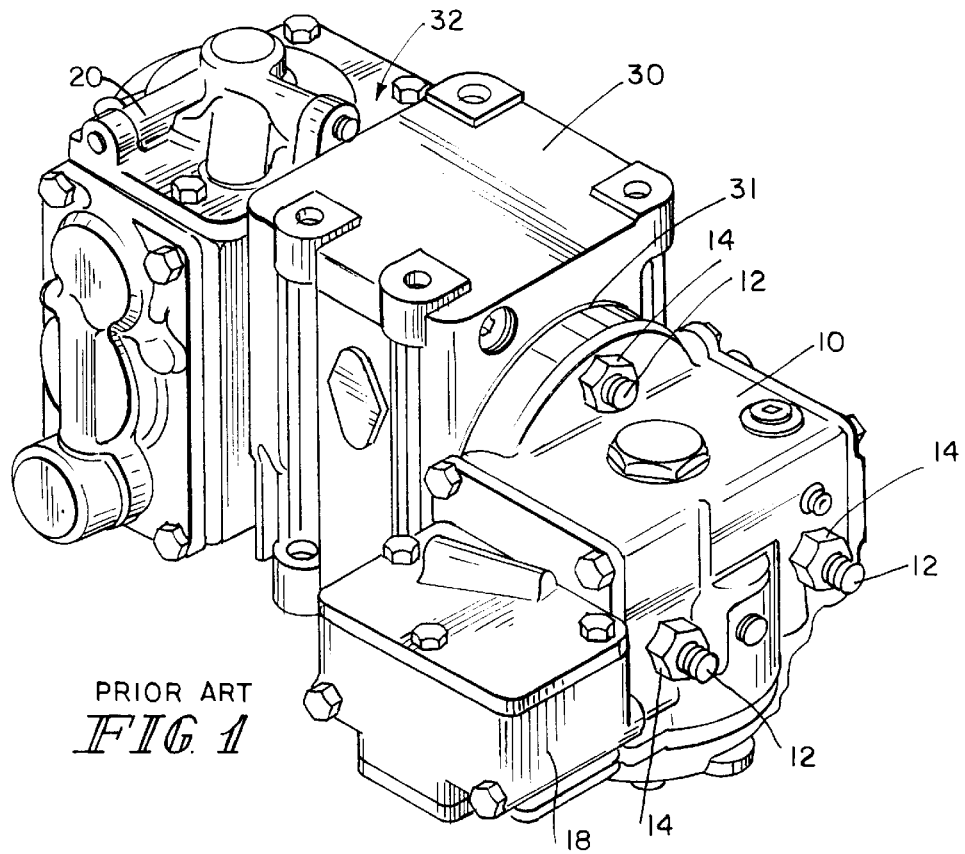
FIG. 1 is a perspective view of a pneumatic brake control valve of the prior art.
Figure 2:
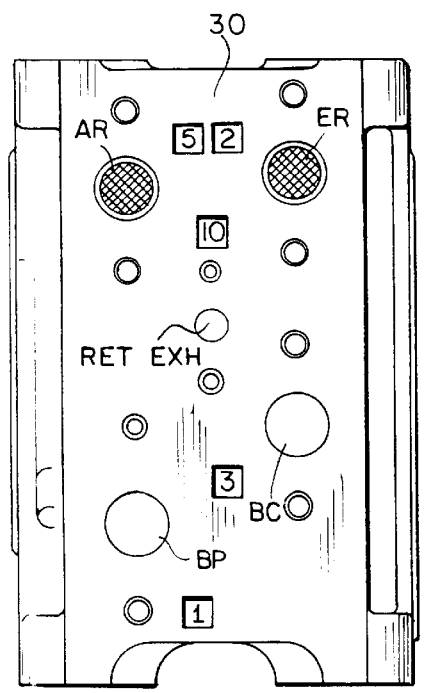
FIG. 2 is a side view of the ports of a pipe bracket of FIG. 1.

A pneumatic brake control valve of the prior art is illustrated in FIG. 1 as including a service portion 10 and an emergency portion 20 connected to a pipe bracket 30 at interfaces 31 and 32 respectively. The service portion is connected to interface 31 and secured thereto by three dual threaded ended posts 12 and nuts 14. The emergency brake portion 20 is mounted to pipe bracket 30 at interface 32 by three similar posts and nuts (not shown). A manually actuated release valve 18 is mounted to the service brake portion 10. The pipe bracket 30, as illustrated in FIG. 2, includes a brake pipe port BP, a brake cylinder port BC, an exhaust or retainer port RET/EXH, an auxiliary reservoir port AR and an emergency reservoir port ER. The numbers in the boxes illustrate the port numbers according to standards of the American Association of Railroads. The additional threaded holes around the ports are to secure the appropriate hoses and pipes. The auxiliary reservoir port AR and the emergency reservoir ER include meshed screens.

Figure 3:
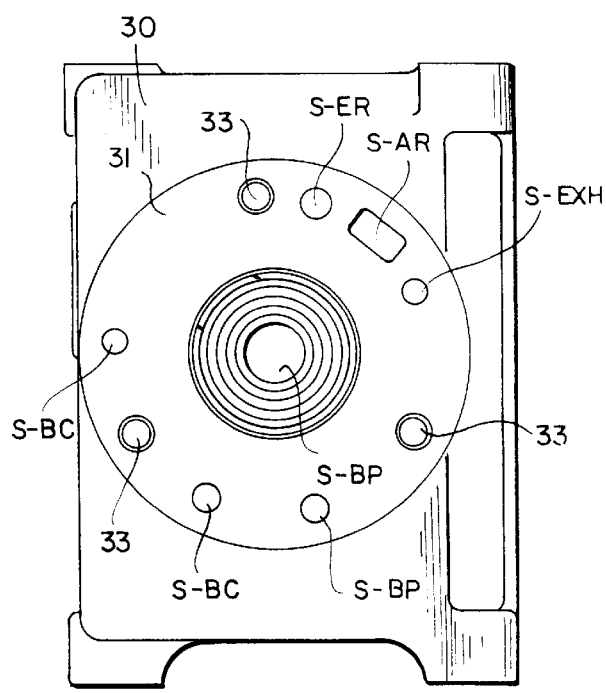
FIG. 3 is a service interface of the pipe bracket of FIG. 1.

The service interface 31 of the pipe bracket 30 is illustrated in FIG. 3. Three threaded apertures 33 are shown to receive the threaded posts 12. The service interface 31 includes interface ports connected to the piping ports of FIG. 2. It includes specifically two brake pipe ports S-BP, two brake cylinder ports S-BC, an emergency reservoir port S-ER, an auxiliary reservoir port S-AR and an exhaust port S-EXH.

The valve illustrated in FIG. 1 is a DB-60 available from New York Air Brake Corporation using a standard pipe bracket 30 which is compatible with other brake control valves. The service interface illustrated in FIG. 3 is a standard service interface to the standard pipe bracket. The adaptor of the present invention is used with the DB-60 as well as other brake control valves, for example, the ABD, ABDW, ABDX.

Figure 4:
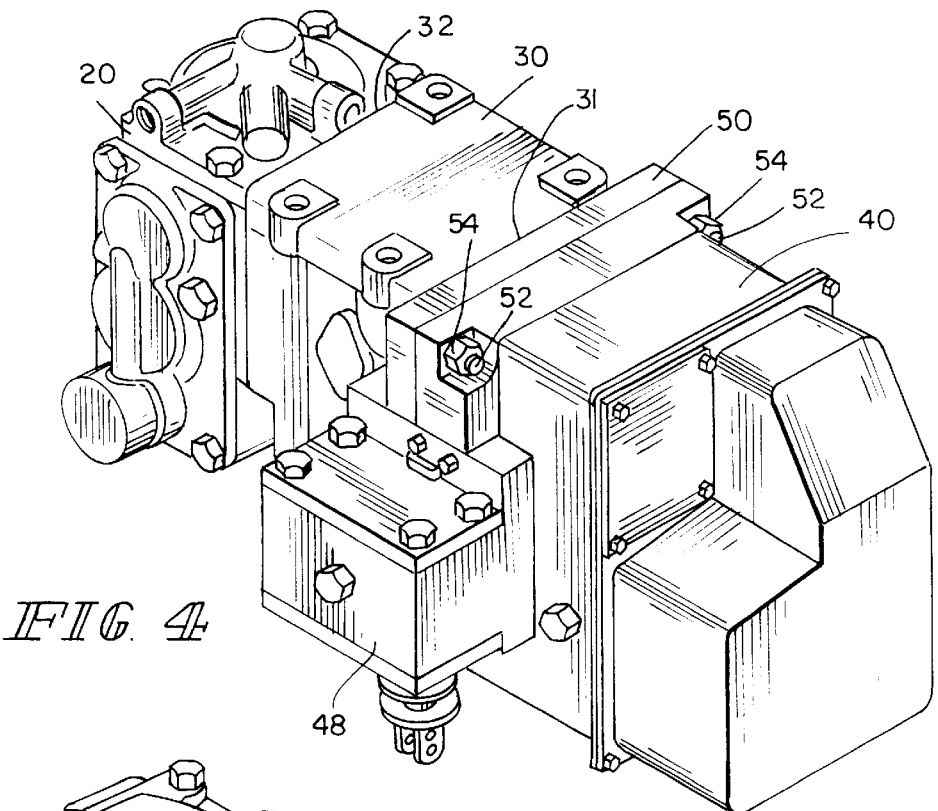
FIG. 4 is a perspective view of a electropneumatic valve and relief valve added to a pneumatic valve having a pipe bracket and emergency portion and incorporating an adaptor according to the principles of the present invention.

An electropneumatic control valve 40 is illustrated in FIG. 4 mounted to the pipe bracket 30 by an adaptor 50. Threaded posts 52 and nuts 54 secure the electropneumatic control valve 40 to the adaptor 50. The standard emergency portion 20 is shown also mounted to the pipe bracket 30. The electropneumatic valve 40 includes a manual release valve 48. The electropneumatic valve 40, which forms no part of the present invention, may electrically control the brake cylinder and possibly the brake pipe through the connections of the pipe bracket 30. The emergency portion 20 would act as an emergency section or vent valve to vent the brake pipe. The electropneumatic valve 40 may also have a fail-safe pneumatic operation when the electrical part is inoperative. An example of such an electropneumatic brake control valve is described in co-pending U.S. application Ser. No. 08/708,984, filed Sep. 6, 1996.

Figure 5:
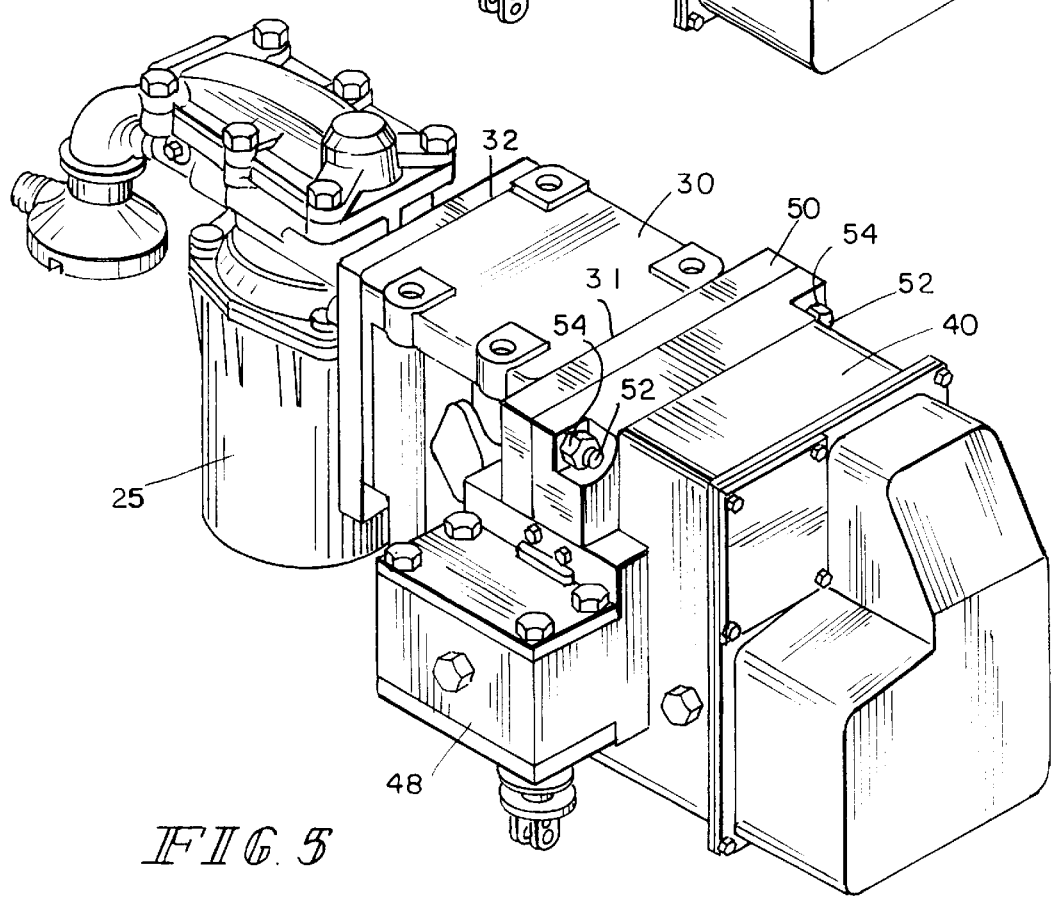
FIG. 5 is a perspective view of a pipe bracket and vent valve connected by an adaptor according to the principles of the present invention to an electropneumatic valve.

In lieu of the standard emergency brake portion 20, a relief valve 25 may be mounted at interface 32 to the pipe bracket 30 as illustrated in FIG. 5. The electropneumatic control valve 40 is mounted by adaptor 50 to the service interface 30 of the standard pipe bracket 30. The operation of valves in FIGS. 4 and 5 are the same with respect to the electropneumatic portion and the venting function.

Figure 6:
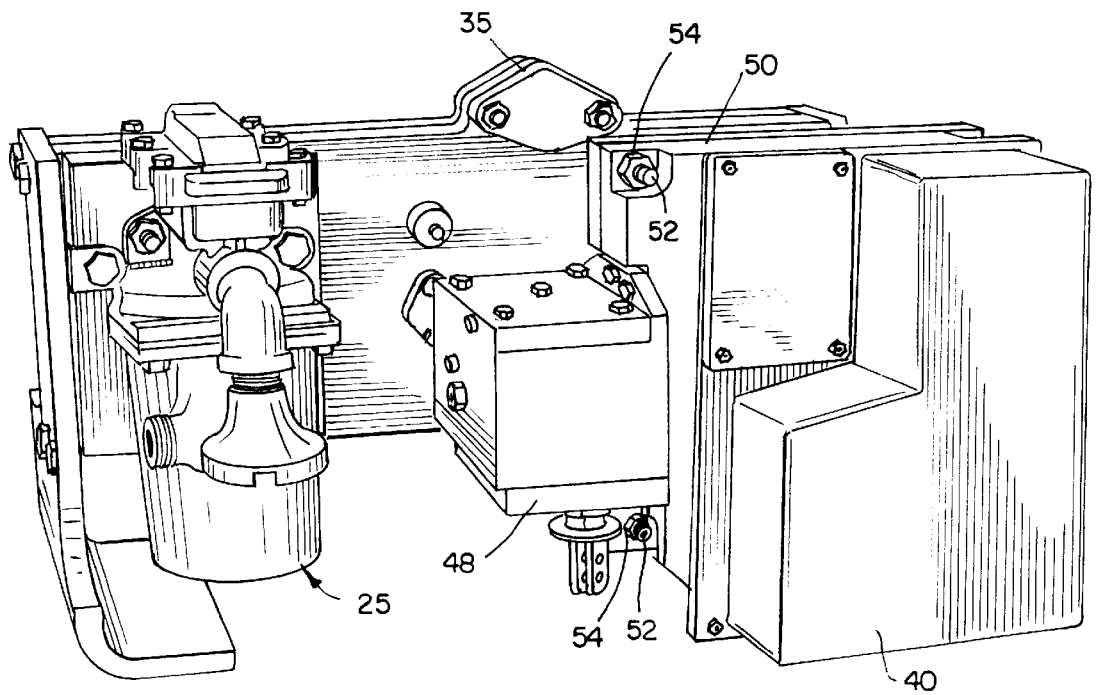
FIG. 6 is a perspective view of a single sided pipe bracket with a vent valve including an adaptor according to the principles of the present invention and an electropneumatic valve.

The same principles are adaptable to a single sided pipe bracket illustrated in FIG. 6. The vent valve 25 is mounted on the emergency interface of the pipe bracket 35 and the electropneumatic valve 40 via adaptor 50 is mounted to the service interface of the single sided pipe bracket 35. The emergency and service interfaces are on the same side of the pipe bracket 35. The porting to the remainder of the brake system is on the back side of the single sided pipe bracket 35.

Figure 7:
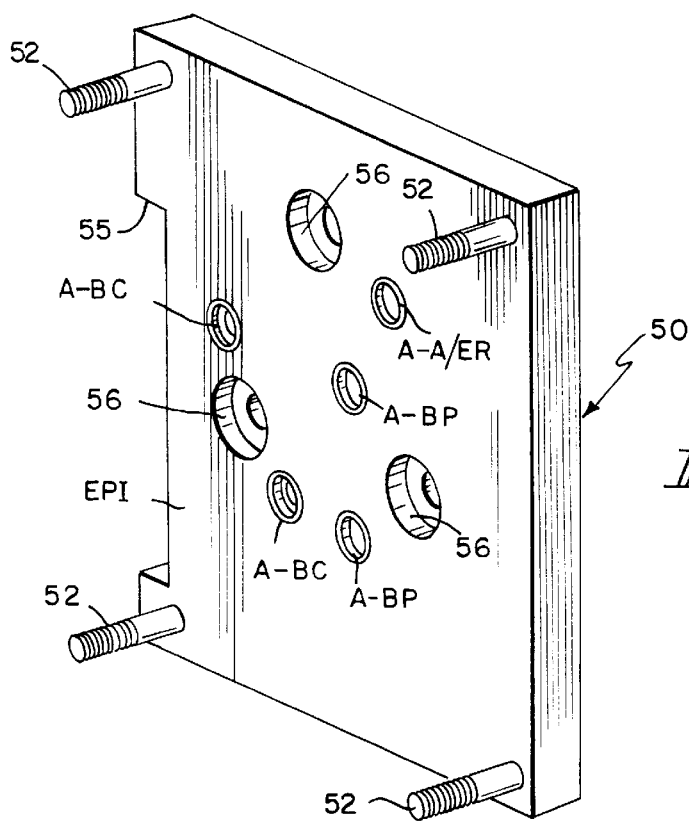
FIG. 7 is a perspective view of the electropneumatic interface of an adaptor according to the principles of the present invention.

An adaptor 50 is illustrated in FIGS. 7–10 as having an electropneumatic interface EPI in FIG. 7 and a pipe bracket interface PBI illustrated in FIG. 10. The four threaded posts 52 are shown extending from the brake pipe interface BPI with their other threaded end received in the electropneumatic interface EPI. Three recessed or countersunk fastener apertures 56 are provided in the EP interface EPI which align and receive fasteners to mount the adaptor 50 in the threaded apertures 33 of the service interface 31 of the pipe bracket 30. The recess portion of aperture 56 receives the head of the bolt such that it does not extend beyond the interface EPI.

The electropneumatic interface EPI includes two brake pipe ports A-BP, two brake cylinder ports A-BC and a single reservoir port A-A/ER. The specific number of ports on the electropneumatic interface EPI is determined by the configuration of the electropneumatic valve. Specific ports shown are merely an example.

The pipe bracket interface PBI is illustrated in FIG. 10 includes two brake pipe ports A-BP, two brake cylinder ports A-BC and a combined reservoir port A-A/ER. A kidney shaped recess 58 is provided on the brake pipe interface BPI which extends between the emergency reservoir and the auxiliary reservoir ports S-ER and S-AR of the service interface 31 of the pipe bracket. Thus, both the emergency reservoir and the auxiliary reservoir are connected to the electropneumatic control valve 40 through a single port A-A/ER. This allows charging of both the reservoirs using a single port as well as making both reservoirs available to operate the brake cylinder.

To interconnect the two brake cylinder ports A-BC, a pair of bores 51 and 53 extending respectively from the side and bottom of the adaptor 50 intersect. The ends of the bore 51 and 53 would be capped.

Figure 11:
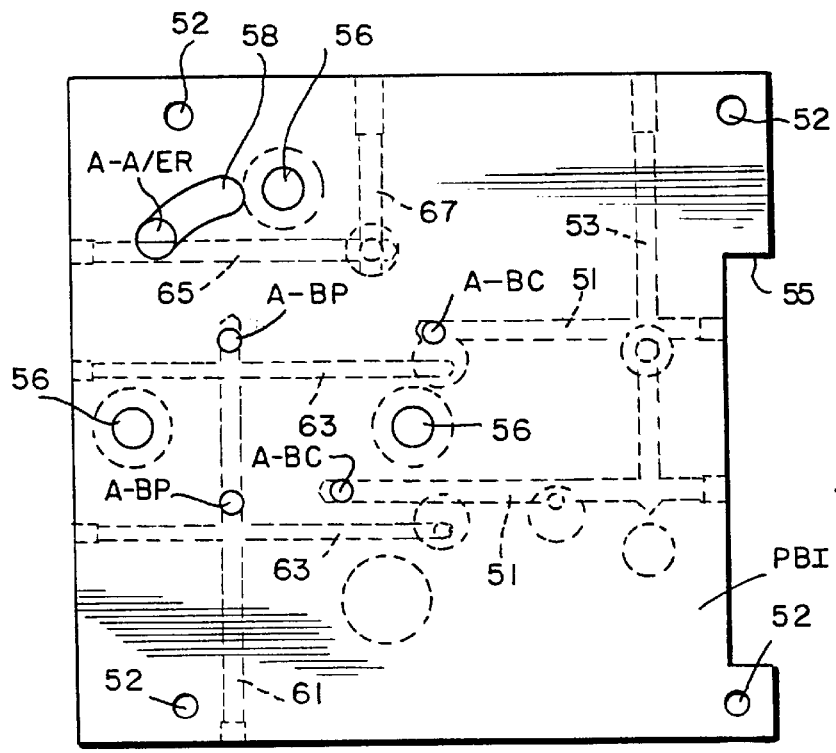
FIG. 11 is a plan view of the pipe bracket interface of another adaptor according to the principles of the present invention.
Figure 12:
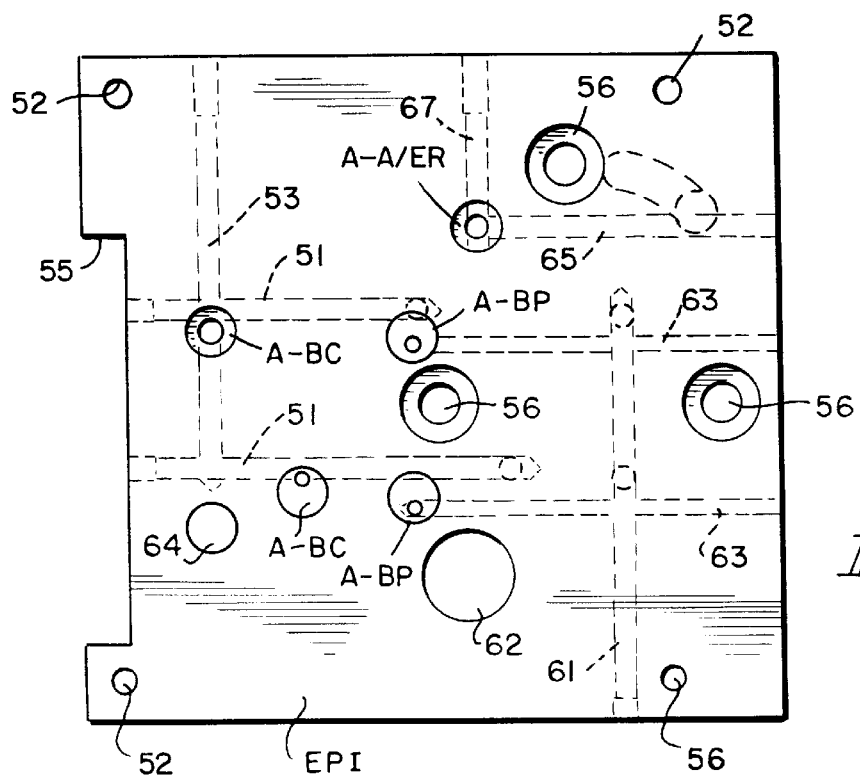
FIG. 12 is plan view of the electropneumatic interface of the adaptor of FIG. 11.

In the adaptor of FIGS. 7–10, the ports on the pipe bracket interface PBI and the ports on the electropneumatic interface EPI are aligned or coaxial. This may not always be the case, and the particular ports may be offset. An adaptor for this situation is illustrated in FIGS. 11 and 12. For sake of clarity, the ports, which are available at a particular interface include a legend at that interface while the ports which are blocked at that interface are shown in dotted lines and do not include a legend. The coring or crossbores do have legends in each of the FIGS. 11 and 12. By way of example, the adaptor of FIGS. 11 and 12 has the same pipe bracket interface PBI and a modified electropneumatic interface EPI compared to FIGS. 7–10.

The pipe bracket interface PBI is illustrated in FIG. 11 and includes a kidney shaped recess 58 for a combined auxiliary and reservoir port A-A/ER, two brake pipe ports A-BP and two brake cylinder ports A-BC. Also, three fastener recesses 56 are in the pipe bracket interface PBI as are the ends of the threaded post 52.

The electropneumatic interface EPI includes a combined auxiliary and emergency reservoir port A-A/ER, two brake pipe ports A-BP and two brake cylinder ports A-BC. Each of these ports are counterbored so as to receive an appropriate seal or gasket. In addition, the electropneumatic interface EPI includes the countersunk fastener apertures 56 and the threaded bores for the thread post 52.

Additional recesses 62 and 64 are provided in the electropneumatic interface EPI. These receive gaskets to seal or blank ports on the electropneumatic valve at the interface EPI. For example, the recess 64 is opposite a number 16 port which may not be used in one implementation but may be used in another. The recess 62 would receive a gasket for blanking a filter port on the electropneumatic valve. This allows access to the filter for changing. These are but two examples of additional recesses provided on the electropneumatic interface EPI to receive gaskets to blank unused ports on the electropneumatic valve.

As previously discussed, the ports on the brake pipe interface BPI and the corresponding ports on the electropneumatic interface EPI are offset in the embodiment of FIGS. 11 and 12. To accommodate these offsets, additional coring or bores are provided in the adaptor 50. As in the adaptor of FIGS. 7–10, the adaptor of FIGS. 11–12 includes a vertical bore 53 and a horizontal bore 51 connecting the brake cylinder ports A-BC. In FIGS. 11 and 12, an additional horizontal bore 51 is provided. This interconnects the brake cylinder ports A-BC on each of the interfaces as well as connecting the pair of brake cylinder ports A-BC to each other. A vertical bore 61 with a pair of intersecting horizontal bore 63 interconnect the brake pipe ports on each of A-BP on each of the interfaces to each other. A horizontal bore 65 connects the combined auxiliary emergency reservoir ports A-A/ER on the two interfaces. A vertical bore 67 provides an access or test port to the auxiliary/emergency reservoir at the top of the adaptor.

While the entrances of bores 51, 61, 63 and 65 are sized to receive a plug, the openings of bores 53 and 67 at the top side of the adaptor are sized to receive an appropriate element to act as an access or test port. This provides a test port for the brake cylinder at bore 53 and the auxiliary/emergency reservoir at bore 67.

In lieu of boring, the adaptor 50 may be cast and channels may be formed only interconnecting the ports without extending to the exterior surfaces.

A recess 55 is provided in the side of the adaptor 50 to accommodate the release valve 48 which extends past the interface of the electropneumatic valve 40 with the adaptor 50. With other electropneumatic valves, the manual relief valve may not be provided or it may be located in a different position. In such a case, the adaptor 50 may not require the recess 55.

Although the adaptor is mounted to the pipe bracket by separate fasteners than those that mount the electropneumatic valve to the adaptor, common fasteners can be used if appropriate bores can be provided in the electropneumatic valve which align with apertures 33 in the pipe bracket and apertures 56 in the adaptor.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An adaptor for connecting and mounting an electropneumatic control valve to a first or second face of a pipe bracket of a pneumatic brake control valve; said pipe bracket having interface ports at said first and second faces for mating with a service brake portion and an emergency brake portion when interconnected to said pipe bracket at a respective face; said pipe bracket having passages connecting a brake pipe port, a brake cylinder port, an emergency reservoir port and an auxiliary reservoir port to said interface ports at said faces; said electropneumatic valve having a brake pipe port, a brake cylinder port and a reservoir port at a first face; said pipe bracket having apertures at said first and second faces which receive fasteners which mount said brake portions to said faces, said electropneumatic valve having apertures at said first face which receives fasteners, the adaptor comprising:

a first interface for said first face of said pipe bracket and a second opposed interface for said first face of said electropneumatic valve;

a brake pipe passage connecting brake pipe ports at said first and second interfaces, which mate with said brake pipe interface port of said pipe bracket and said brake pipe port of said electropneumatic valve;

a brake cylinder passage connecting brake cylinder ports at said first and second interfaces, which mate with said brake cylinder interface port of said pipe bracket and said brake cylinder port of said electropneumatic valve;

a reservoir passage connecting reservoir ports at said first and second interfaces, which mate with said emergency and auxiliary reservoir interface ports of said pipe bracket and said reservoir port of said electropneumatic valve; and fastener apertures extending between said first and second opposed interfaces which align with said apertures of said pipe bracket.

2. An adaptor according to claim 1 including fasteners extending from said second interface which align with said apertures of said electropneumatic valve.

3. An adaptor according to claim 1 wherein said first and second faces are on opposed sides of said pipe bracket.

4. An adaptor according to claim 1 wherein said first and second faces are on the same side of said pipe bracket.

5. An adaptor according to claim 1 including a recess in an edge of said adaptor extending between said interfaces for receiving a portion of said electropneumatic valve which extends beyond said first face of said electropneumatic valve.

6. An adaptor according to claim 1 wherein said first face of said pipe bracket is for mating with a service brake portion.

7. An adaptor according to claim 1 wherein corresponding ports at said first and second interfaces are coaxial and connected by said passages extending transverse to said interfaces.

8. An adaptor according to claim 1 wherein corresponding ports at said first and second interfaces are offset and connected by said passages extending parallel to said interfaces.

9. An adaptor according to claim 1 wherein said fastener apertures are counter sunk on said second interface.

10. An adaptor according to claim 1 including a recess on said second interface to mate with a port on said first face of said electropneumatic valve and a seal in said recess.

11. An adaptor for connecting an electropneumatic control valve to a pipe brake of pneumatic brake control valve; said pipe bracket having interface ports at first and second faces for mating with a service brake portion and an emergency brake portion when interconnected to said pipe bracket at a respective face; said pipe bracket having passages connecting two brake pipe ports, a brake cylinder port, an emergency reservoir port and an auxiliary reservoir port to said interface ports at said faces; said electropneumatic valve having two brake pipe ports, a brake cylinder port and a reservoir port at a first face; said pipe bracket having apertures at said first and second faces which receive fasteners which mount said brake portions to said faces, said electropneumatic valve having apertures at said first face which receives fasteners, the adaptor comprising:

- a first interface for said first face of said pipe bracket and a second interface for said first face of said electropneumatic valve;
- two brake pipe passages each connecting a pair of brake pipe ports at said first and second interfaces, which mate with said brake pipe interface ports of said pipe bracket and said brake pipe ports of said electropneumatic valve;
- a brake cylinder passage connecting brake cylinder ports at said first and second interfaces, which mate with said brake cylinder interface port of said pipe bracket and said brake cylinder port of said electropneumatic valve;
- a reservoir passage connecting reservoir ports at said first and second interfaces, which mate with said emergency and auxiliary reservoir interface ports of said pipe bracket and said reservoir port of said electropneumatic valve; and
- fastener apertures extending between said first and second interfaces which align with said apertures of said pipe bracket.

12. An adaptor for connecting an electropneumatic control valve to a pipe bracket of a pneumatic brake control valve; the pipe bracket having interface ports at first and second faces for mating with a service brake portion and an emergency brake portion when interconnected to said pipe bracket at a respective face; said pipe bracket having passages connecting a brake pipe port, two brake cylinder ports, an emergency reservoir port and an auxiliary reservoir port to said interfaces ports at said faces; said electropneumatic valve having a brake pipe port, a brake cylinder port and a reservoir port at a first face; said pipe bracket having apertures at said first and second faces which receive fasteners which mount said brake portions to said faces, said electropneumatic valve having apertures at said first face which receives fasteners, the adaptor comprising:

- a first interface for said first face of said pipe bracket and a second interface for said first face of said electropneumatic valve;
- a brake pipe passage connecting brake pipe ports at said first and second interfaces, which mate with said brake pipe interface port of said pipe bracket and said brake pipe port of said electropneumatic valve;
- a brake cylinder passage connecting the two brake cylinder ports at said first to said brake cylinder port on said second interfaces, which mate with said two brake cylinder interface ports of said pipe bracket and said brake cylinder port of said electropneumatic valve;
- a reservoir passage connecting reservoir ports at said first and second interfaces, which mate with said emergency and auxiliary reservoir interface ports of said pipe bracket and said reservoir port of said electropneumatic valve; and
- fastener apertures extending between said first and second interfaces which align with said apertures of said pipe bracket.

\* \* \* \* \*